United States Patent
Rowland

[19]

[11] Patent Number: 5,934,695
[45] Date of Patent: Aug. 10, 1999

[54] STACKABLE TRAILERS

[76] Inventor: Leroy J. Rowland, P.O. Box 340, Folly Beach, S.C. 29439

[21] Appl. No.: 08/962,575

[22] Filed: Nov. 3, 1997

[51] Int. Cl.$^6$ ........................................... B60P 3/06
[52] U.S. Cl. ..................... 280/33.998; 280/789; 410/57
[58] Field of Search ................ 280/33.991, 33.998, 280/789; 410/30, 56, 57, 65, 66; 296/181, 182

[56] References Cited

U.S. PATENT DOCUMENTS

| | | |
|---|---|---|
| 1,538,297 | 5/1925 | Mitchell . |
| 3,580,627 | 5/1971 | Underwood . |
| 3,611,949 | 10/1971 | Peisner . |
| 3,841,509 | 10/1974 | Chisum . |
| 4,066,289 | 1/1978 | Gargour . |
| 4,611,962 | 9/1986 | Braly et al. . |
| 4,952,118 | 8/1990 | MacMillan . |
| 4,986,705 | 1/1991 | Durkin . |
| 5,873,593 | 2/1999 | Gesuale ............................. 280/33.991 |

*Primary Examiner*—Kevin Hurley
*Attorney, Agent, or Firm*—Dority & Manning, P.A.

[57] ABSTRACT

A method and apparatus for stacking two or more trailers that are used for transporting containers. Each of the trailers has recesses positioned directly over the rear wheels for receiving the rear wheels of a trailer stacked thereon. Smaller recesses are provided adjacent a front end of the trailer for receiving a wheel carried on the lower end of a landing gear of the trailer stacked thereon. The trailers can be stacked one upon the other for storage.

11 Claims, 2 Drawing Sheets

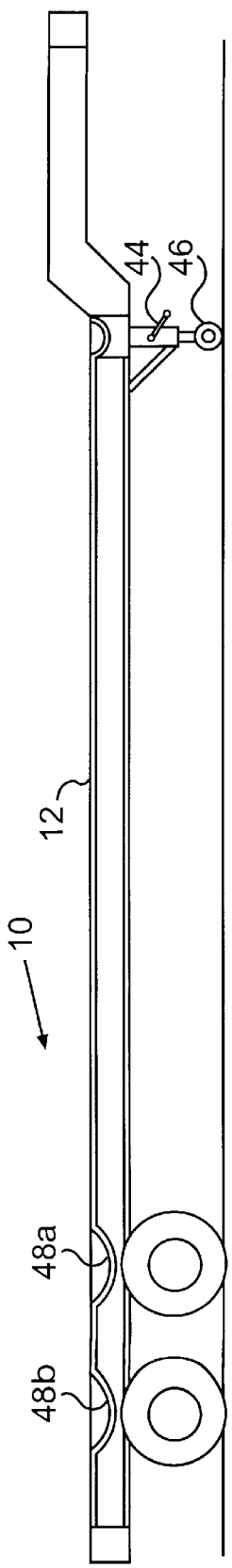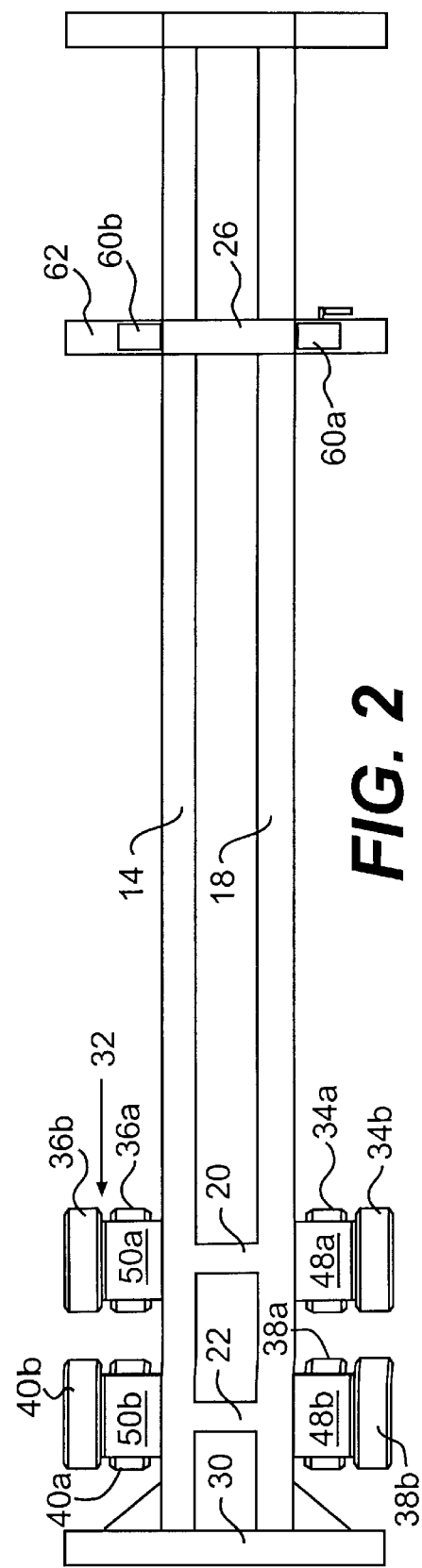

STACKABLE TRAILERS

BACKGROUND OF THE INVENTION

In recent years, it has become common practice to ship goods in metal containers that are adapted to be transported by ship and tractor trailers. As a result of the ships carrying a substantial number of the containers, it is necessary to maintain an inventory of trailers at the unloading and loading sites. Such takes up a substantial amount of space. Normally, the ports where the containers are shipped are limited in size presenting a problem for storing large numbers of trailers waiting to be used. It has been common practice in the past to transport the trailers in a stacked configuration. However, when they are placed one on top of the other, they are normally inverted requiring each trailer as they are being unstacked to be turned over so as to properly position the wheels on the ground for use. This oftentimes causes damage to the hydraulic equipment associated with the trailers.

In U.S. Pat. No. 4,611,962 there is disclosed a container chassis bundling system wherein trailers are stacked upon each other. Each of these trailers require substantial modifications so that the trailers can be securely stacked one upon the other.

SUMMARY OF THE INVENTION

A method and apparatus for stacking two or more trailers used for transporting containers upon each other. Each of the trailers includes an elongated body portion, a set of rear wheels and a retractable landing gear. Recesses are provided on the elongated body portion adjacent a rear end of the elongated body directly above the rear wheels of the trailer. A second pair of recesses are provided in the elongated body portion of the trailer for receiving a landing gear of a trailer stacked thereon. As a result of the recesses provided in the elongated body portion of the trailer, the trailers can be stacked one upon the other with the recesses adjacent the rear of the trailer and adjacent the front of the trailer receiving the tires and landing gear of the trailer stacked thereon respectively. Accordingly, it is an important object of the present invention to provide trailers capable of transporting containers with recesses so as to enable trailers to be stacked one upon the other.

Another important object of the present invention is to provide trailers with stacking recesses which securely position a trailer stacked thereon in position.

Still another important object of the present invention is to provide a method of conserving space in shipping yards by designing trailers that are used for shipping containers so that they can be stacked one upon the other.

Many additional objects and advantages of the present invention will be evident to those skilled in the art from the following description and drawings, wherein:

FIG. 1 is a side elevational view illustrating a trailer constructed in accordance with the present invention.

FIG. 2 is a planned view of a trailer constructed in accordance with the present invention.

DESCRIPTION OF THE PREFERRED EMBODIMENTS

Figure 3:
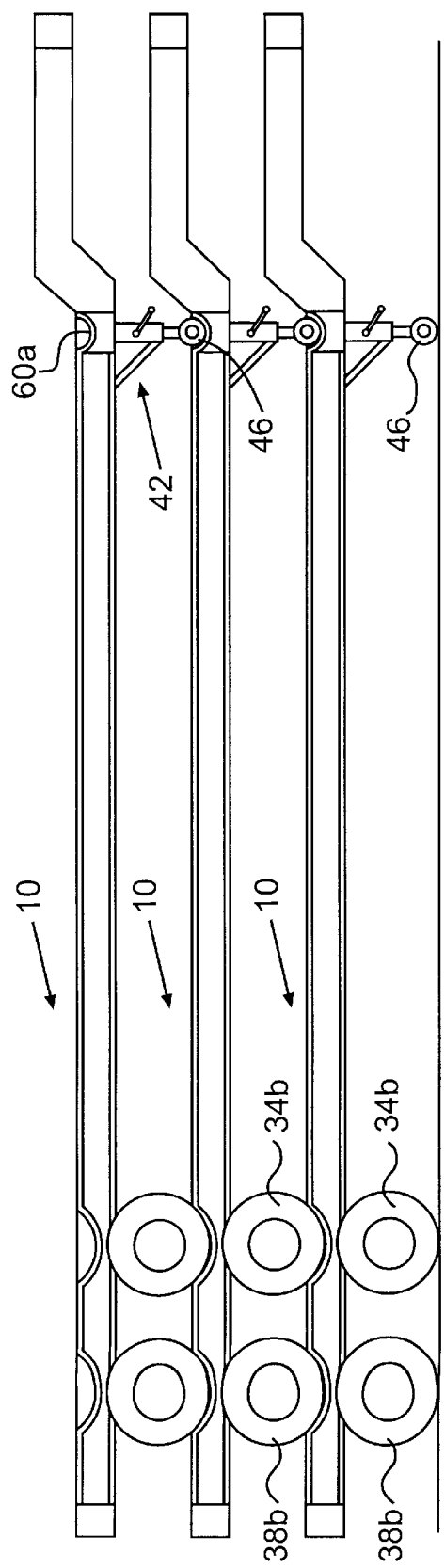
FIG. 3 is a side elevational view showing three trailers stacked one upon the other.

Referring to FIG. 1 of the drawing, there is illustrated a conventional trailer generally designated by the reference character 10 that is normally used for transporting containers and the like. The containers not shown are normally rectangular in shape and are generally shipped by rail or by ships. The containers, when being transported by ship, are generally stacked one on top of another so that a ship can carry a very large number of containers. When these containers arrive at port, it is necessary to transfer them from the ship to the flatbed trailers 10 that are connected to tractors for transporting the containers to their desired destination. The trailers include an elongated body 12 that generally consists of two parallel eye beams 14 and 18. The eye beams are connected together by any suitable bracing such as the cross-braces 20, 22 and 26. Laterally extending beams 28 and 30 are connected to the opposed ends of the beams 14 and 18.

The rear end of the trailers 10 are supported by a pair of tandem wheels generally designated by the reference character 32. Each pair of tandem wheels include four wheels 34a, 34b, 36a, 36b, and 38a, 38b, 40a and 40b, respectively. The wheels 34a, 34b, 36a and 36b are supported on one axle. The wheels 38a, 38b, 40a and 40b are supported on another axle. The axles are in turn supported by the rear end of the elongated body of the trailer in a conventional manner and as a result, the details of such are not illustrated. When the trailer 10 is parked, the front of the trailer is supported on a landing gear generally designated by the reference character 42 that is carried adjacent the front end of the trailer. The landing gear 42 can be raised and lowered in any suitable manner such as by a crank 44. The landing gear 42 is shown in its lowered position. Positioned adjacent the lower end of the landing gears 42 are a pair of small wheels 46.

A pair of arcuate recesses 48a and 48b are carried adjacent the rear end of the elongated body portion of the trailer. Another pair of arcuate recesses 50a and 50b are carried on the other side of the eyebeams 18 and 14. The location of the recesses 48a, 48b, 50a and 50b is such that they are positioned directly above the innermost tires of the tandem wheels, that is the tires 34a, 36a, 38a and 40a. Such is to enable a trailer to be stacked on top of another trailer so that the innermost tires 34a, 36a, 38a and 40a can rest within the respective recesses 48a, 48b, 50a and 50b. The recesses can be suitably braced for carrying substantial loads and are normally constructed of metal. The bracing for the recesses is not disclosed since such can be accomplished in any suitable manner that would be known to one skilled in the art.

Positioned adjacent the other end of the trailer is another pair of smaller recesses 60a and 60b. These recesses 60a and 60b are provided in a cross support member 62 that is secured to the elongated eye beams 14 and 18. The recesses 60a and 60b are arcuate in shape for receiving the wheels 46 carried on the lower end of the landing gear.

When the trailers are stacked as shown in FIG. 3, the innermost wheels of each pair of tandem wheels are positioned within the arcuate members 48a, 48b, 50a and 50b and the two wheels 46 carried on the lower end of the landing gear nest within the arcuate members 60a and 60b. As a result, the trailers are securely stacked one upon the other. While in the preferred embodiment recesses are used for receiving the wheels of trailers when stacking, it is to be understood that other types of wheel receivers could be used as long as the wheel receivers prevent the stacked trailer from moving on the trailer therebelow.

On some trailer, there is a flat plate on the bottom of the landing gear. When stacking these trailers is not necessary to use an arcuate receiver 60a such as shown in the drawing and in some instances it is not necessary to use a receiver. In a modified form of the invention a rectangular receiver formed by rods or flat plates can be welded together and fixed to the trailer bed. They correspond to the shape of the flat plate carried on the bottom of the landing gear. The flat plate carried on the bottom of the landing gear would, when stacking trailers, be positioned in a recess defined by the welded rods or plates to positively position the stacked trailer on the trailer supporting it. In other words, the recess formed by the welded rods would be used instead of the arcuate receiver 60a.

Having thus described the invention in terms of a preferred embodiment, it will be readily apparent to those skilled in the art that many modifications and variations may be introduced without departing from the invention scope of the present invention.

What is claimed:

1. A trailer for use with a tractor for transporting containers comprising:

an elongated body portion;

a set of wheels supporting a rear end of said elongated body;

a retractable landing gear carried adjacent a front portion of said elongated body for supporting a front end of said elongated body portion when in a lowered position;

a first pair of recesses provided in said elongated body portion directly above said set of wheels for receiving the rear wheels of another trailer;

a second pair of recesses provided in said elongated body portion for receiving a landing gear of another trailer, said first and second pair of recesses being longitudinally spaced so as to receive the rear wheels and landing gear respectively of another trailer when said another trailer is stacked on a trailer.

2. The trailer as set forth in claim 1 wherein said first pair of recesses are concave and correspond in shape to the wheels of said trailer.

3. The trailer as set forth in claim 1 wherein said landing gear has a pair of wheels carried on a lower end thereof, and said second pair of recesses are concave in shape and correspond in shape to said wheels carried on the lower end of said landing gear.

4. The trailer as set forth in claim 1 further comprising a second set of rear wheels, each set of rear wheels including four wheels with two of said wheels being positioned on one side of said elongated body and the remaining two wheels of said set being positioned on the other side of said elongated body.

5. The trailer as set forth in claim 1 wherein said set of rear wheels including two pairs of side by side wheels with one pair of said wheels being positioned on one side of said elongated body and the other pair of said wheels being positioned on the other side of said elongated body.

6. The trailer as set forth in claim 5 wherein when stacking one trailer upon another one of said wheels of each pair of side by side wheels rests in a respective recess of said first pair of recesses.

7. A method of stacking two or more trailers used for transporting containers upon each other, each of said trailers including an elongated body portion, a set of rear wheels and a retractable landing gear, said method comprising:

providing recesses on said elongated body portion of said trailer adjacent a rear end of said elongated body, said recess corresponding to the shape of said rear wheel;

placing said trailers one upon another with said rear wheels of said trailers located above a lower trailer being positioned in said recesses carried in said trailer directly therebelow;

whereby said trailers are securely held in a stack by means of said wheels of said stacked trailers being inserted in said recesses of the trailer directly therebelow.

8. The method as set forth in claim 7 further comprising:

providing recesses adjacent a front position of said trailers for receiving said landing gear of said trailer stacked thereon for aiding in holding said trailers in a secure stack.

9. A trailer for use with a tractor for transporting containers comprising:

an elongated body portion;

a set of wheels supporting a rear end of said elongated body;

a retractable landing gear carried adjacent a front portion of said elongated body for supporting a front end of said elongated body portion when in a lowered position;

a first pair of wheel receivers provided in said elongated body portion directly above said set of wheels for receiving the rear wheels of another trailer;

a second pair of wheel receivers provided in said elongated body portion for receiving a landing gear of another trailer, said first and second pair of wheel receivers being longitudinally spaced so as to receive the rear wheels and landing gear respectively of another trailer when said another trailer is stacked on a trailer.

10. A trailer for use with a tractor for transporting containers comprising:

an elongated body portion;

a set of wheels supporting a rear end of said elongated body;

a retractable landing gear carried adjacent a front portion of said elongated body for supporting a front end of said elongated body portion when in a lowered position;

a pair of wheel receivers provided in said elongated body portion directly above said set of wheels for receiving the rear wheels of another trailer;

a landing gear receiver provided on said elongated body portion for receiving a landing gear of another trailer, said pair of wheel receivers and said landing gear receiver being longitudinally spaced so as to receive the rear wheels and landing gear respectively of another trailer when said another trailer is stacked on a trailer.

11. The trailer as set forth in claim 10 wherein said landing gear receiver includes members welded together to form a recess.

\* \* \* \* \*